Feb. 4, 1969    R. W. VAN PELT    3,426,258
CONTROL MECHANISM ACTUATING MOTOR IN INCREMENTAL MANNER
Filed Jan. 18, 1965
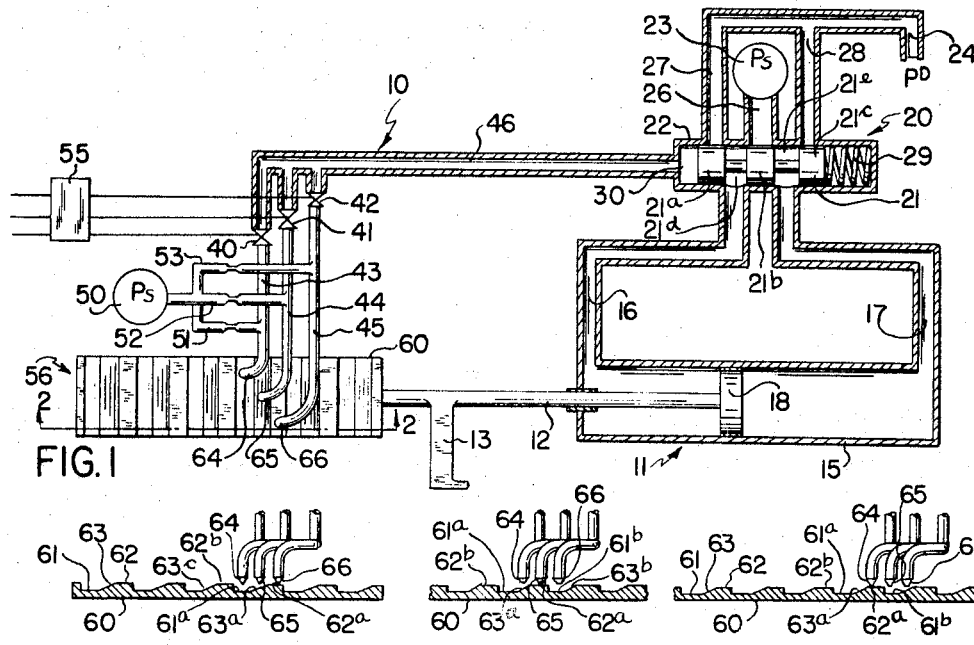
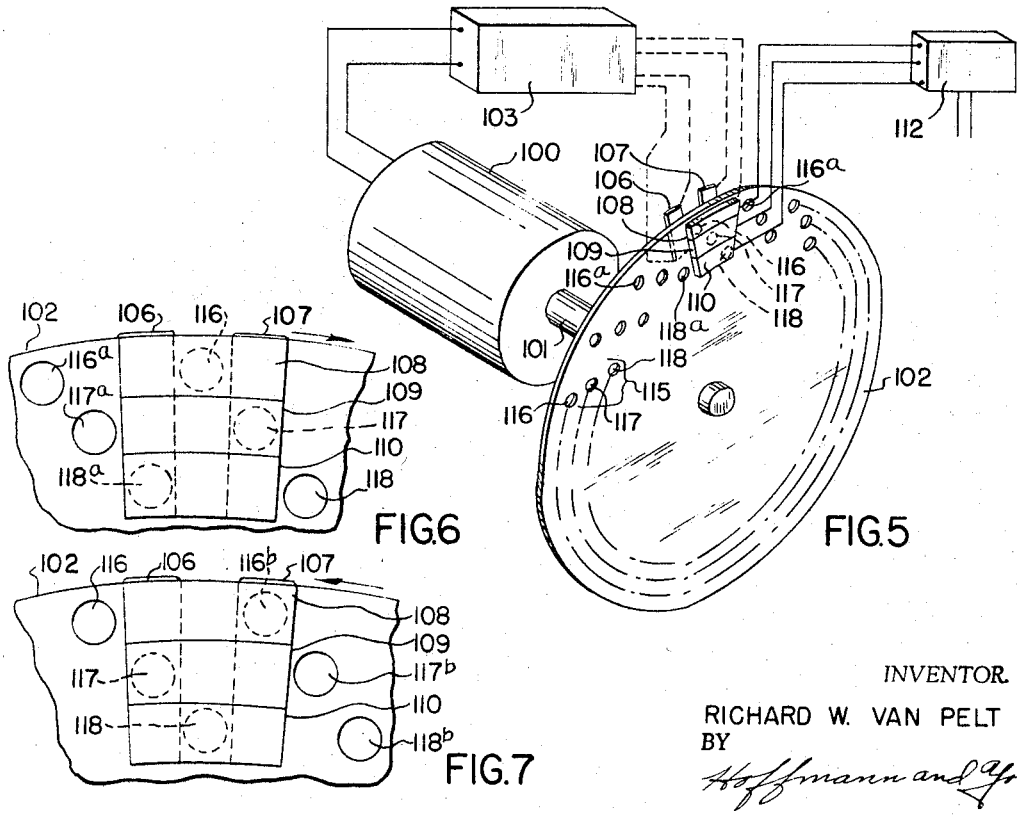
INVENTOR.
RICHARD W. VAN PELT
BY
Hoffmann and Grant
ATTORNEYS United States Patent Office 3,426,258
Patented Feb. 4, 1969

3,426,258
CONTROL MECHANISM ACTUATING MOTOR
IN INCREMENTAL MANNER
Richard W. Van Pelt, 1400 College Ave.,
Houghton, Mich. 49931
Filed Jan. 18, 1965, Ser. No. 426,144
U.S. Cl. 318—18       19 Claims
Int. Cl. H02p 5/48

ABSTRACT OF THE DISCLOSURE

A control mechanism controls the output member of a motor in an incremental manner. A binary device transmits an input signal to energize the motor and a control member moves with the output member. After a predetermined distance, the control member interrupts the energizing signal. Means are provided for sequentially actuating the binary control devices to incrementally step the motor. An electric motor utilizing binary devices responsive to light responsive means 15 utilized in one embodiment. A fluid motor utilizing binary devices in the form of valves 15 utilized in another embodiment.

---

This invention relates to a control mechanism for controlling the movement of the output member of a motor and, particularly, to a control mechanism having binary devices operable to effect transmission of input signals to the motor to actuate the motor in an incremental or stepping manner.

The principal object of the present invention is the provision of a new and improved control mechanism for controlling the movement of the output member of a motor in a stepping or incremental manner without any necessity for modifying the motor or providing an auxiliary stepping motor of any kind in combination with the motor.

Another object of the present invention is the provision of a new and improved control mechanism for controlling the movement of the output member of a motor and wherein a binary device transmits an input signal for energizing the motor and a control member moves with the output member of the motor and interrupts the input signal after the output member of the motor has moved a predetermined distance.

Still another object of the present invention is the provision of a new and improved control mechanism for controlling the movement of the output member of a motor and wherein plural binary control devices are located in different input paths leading to the motor and are operable to effect transmission of an input signal to energize the motor in a first direction, and including a control member movable with the output member of the motor and having means for interrupting the input signal transmitted by one binary control device after a predetermined amount of movement of the output member and for rendering another of the binary control devices effective to transmit an input signal to energize the motor in the first direction, and means for sequentially actuating the binary control devices to incrementally step the output member of the motor.

A further object of the present invention is the provision of a new and improved control mechanism as noted in the next preceding paragraph, wherein the motor may be either a reciprocating or rotary fluid or an electric motor.

A still further object of the present invention is the provision of a new and improved control mechanism for controlling the movement of the output member of a reciprocating fluid motor and having binary devices in the form of valves located in different fluid lines and operable to transmit fluid input signals for energizing the motor in a first direction, and wherein a control member is movable with the output member of the motor and is operable to control the fluid input signal transmitted by one binary control device after a predetermined amount of movement thereof, and to render another of the binary control control devices operable upon energization to transmit an input signal for energizing the motor.

Yet a further object of the present invention is the provision of a new and improved control mechanism for a fluid motor, as noted in the next preceeding paragraph, wherein the control means comprises a plate member having a plurality of high and low surface portions interconnected by an inclined ramp portion and which surfaces move relative to fluid nozzles which provide a back pressure in the respective fluid lines connected with the binary devices in order to provide a back pressure in the lines containing the binary devices, which back pressure constitutes the input signal.

An additional object of the present invention is the provision of a new and improved control mechanism for an electric motor having a plurality of binary devices in the form of lights mounted so as to energize light responsive means for energizing the electric motor, and wherein a control member is operable to restrict the transmission of light from the binary devices to the light responsive means to control the input signal transmitted by the binary devices thereto.

A further object of the present invention is the provision of a new and improved control mechanism, as noted in the next preceding paragraph, wherein the control member comprises a disk supported on the output member of the motor and rotatable therewith and includes a plurality of openings therein through which a light shines and, which when moved, restricts the transmission of light from one binary controrl device to the light responsive means located on the other side of the disk and effects alignment of another opening in the control disk with another of the lights so as to render the other light effective when lit to transmit light to the light responsive means.

Further objects and advantages of the present invention will be apparent to those skilled in the art to which it relates from the following detailed description of the preferred embodiment thereof made with reference to the accompanying drawings forming a part of this specification and wherein:

FIG. 1 is a schematic view of one embodiment of a control mechanism embodying the present invention;

FIG. 2 is a fragmentary cross-sectional view of the control mechanism shown in FIG. 1, taken approximately along the section line 2—2 of FIG. 1;

FIGS. 3 and 4 are views similar to FIG. 2 but showing different operative positions of portions of the control mechanism shown in FIG. 2;

FIG. 5 is a schematic perspective view illustrating another embodiment of a control mechanism embodying the present invention; and FIGS. 6 and 7 are schematic fragmentary views of the mechanism shown in FIG. 5 illustrating parts in different positions.

The present invention provides a novel control mechanism for controlling the movement of the output member of a motor. The novel control mechanism is applicable and may be used with fluid or electrically driven rotary or rectilinear motors. As representative of one application of the present invention, a control mechanism 10 is illustrated in FIG. 1. The control mechanism 10 includes a reciprocating or rectilinear type fluid motor 11 having an output member 12 which is adapted to move a load 13. The load 13 may be of any form of member which is to be accurately positioned and, by way of example, may comprise a slide.

The motor 11, as noted above, is a reciprocating type fluid motor and includes a cylinder 15 with fluid conduits 16 and 17 communicating with the opposite ends of the cylinder and through which fluid may be directed into and from the cylinder to energize the motor in opposite directions. A piston member 18 moves within the cylinders 15 in opposite directions in response to a differential pressure on the opposite faces thereof. The piston member 18 is connected with a piston rod which forms the output member 12 of the motor and which is connected to the load 13 to effect movement of the load upon movement of the output member 12.

The flow of fluid through the lines 16 and 17 to the cylinder 15 for energizing the motor 11 is controlled by a suitable valve mechanism 20. The valve 20 is a spool-type valve having a spool 21 movable in a cylinder 22. The spool 21 includes a plurality of lands and grooves and is adapted to connect the lines 16 and 17 with a supply pressure 23 or a drain connection 24. The plurality of lands on the spool 21 are designated 21a, 21b, and 21c and are separated by grooves 21d and 21e. The chamber in which the spool moves is in communication with the drain connection 24 by means of two spaced conduits 27 and 28, respectively, and is in communication with the source of pressure fluid 23 by means of a conduit 26.

The spool 21 has a normal position, shown in FIG. 1. In its normal position, the spool 21 and, specifically, the lands 21a, 21b, and 21c thereof block the flow of fluid through the conduits 27, 26, and 28, respectively. In this position, the grooves 21d and 21e are in communication with the conduits 16 and 17, respectively. The spool 21 takes its normal position when the force acting on the left end thereof is equal to the spring force acting on the right end when in that normal position. A spring 29 acts on the one end of the spool 21, as viewed in FIG. 1, and biases the spool to the left. The other end of the spool is biased to the right by fluid pressure in chamber 30 at the left end of the valve 20, as viewed in FIG. 1. When the pressure in the chamber 30 is such as to apply a force to the spool 21 in excess of the force applied by the springs 29, the spool moves to the right until the spring force equals the fluid force. When these forces are equal and of a certain intermediate magnitude, the spool takes a centered position as shown. When the pressure in the chamber 30 is such as to apply a force less than that of the spring 29, the spool is moved to the left, as viewed in FIG. 1, until the spring force reduces to equal the fluid force.

Upon movement of the spool 21 to the right, as viewed in FIG. 1, the conduit 16 is connected with the conduit 26 through the groove 21d and, therefore, fluid pressure is applied to the left face of the piston 18, causing the piston to move to the right. When the spool is in this position, the conduit 17 is connected with the conduit 28 through the groove 21e, which causes fluid from the right end of the fluid motor to drain through the drain connection 24. Movement of the spool 21 to the left, as viewed in FIG. 1, causes the conduit 17 to be connected with the conduit 26 through the groove 21e and thereby causes the flow of fluid to the right end of the cylinder 15, applying a force to the piston 18 and tending to move the piston 18 to the left. In this position, the conduit 16 communicates with the conduit 27 through the groove 21d causing a flow of fluid therethrough to the drain connection 24 and, of course, the piston 18 will move to the left, as viewed in FIG. 1.

The control mechanism 10 includes a plurality of binary control devices 40, 41, and 42 located in different input paths leading to the motor and are operable to transmit an input signal to the valve 20 to cause the valve 20 to energize the motor to move the output member thereof in a given direction. Specifically, the binary control devices control the pressure in the chamber 30 of the valve 20 so as to effect operation of the valve, as will be described in detail hereinbelow.

The binary control devices 40, 41, and 42 are separate individual valves which are operable between open and closed positions to permit or prevent a fluid input signal to flow therethrough to the valve 20. Each valve 40, 41, 42 is located in a different fluid line, 43, 44, 45, respectively, all of which communicate with fluid line 46 which in turn, communicates with the chamber 30 of the valve 20. The conduits 43, 44, 45 in which the valves 40, 41, 42 respectively, are located all communicate with a source of fluid pressure 50 by means of conduits 51, 52, and 53 respectively, each of which contains a flow restricting orifice.

The binary control devices 40, 41, and 42 are adapted to be sequentially opened in order to provide for fluid flow therethrough by means of any suitable control mechanism, generally designated 55. The control mechanism 55 may be of any suitable type and may be the output of a computer or other such suitable electric control for actuating the valves 40, 41, 42. When an electrical control is utilized for the valves 40, 41, 42, the valves may be of any conventional on-off solenoid actuated type. If the control mechanism varies, the valves, of course, may have to be varied so as to be actuated thereby.

From the above description, it should be apparent that whenever any one of the binary devices 40, 41, or 42 is open, it transmits the pressure in its respective line 43, 44 or 45 to the chamber 30 of the valve 20, which pressure constitutes an input signal for energizing the motor. The magnitude of this pressure or input signal, however, is determined and controlled by a control means, generally designated 56. The control means 56 includes a control plate member 60 connected with the output member 12 of the motor 11, and which member 60 moves with the output member 12 upon movement thereof. The control member 60 is provided with means for rendering one of the valves 40, 41, 42, effective to move the spool 21 in one direction and means effective to move the spool 21 in the other direction, and to maintain the spool in its neutral position. The control member 60 also is constructed to control the input signal provided by a particular binary device to the valve 20 so as to stop the motor after a predetermined movement thereof.

The control plate member 60 comprises a plurality of camlike surfaces in a repeating sequence. The control plate 60 includes a plurality of low surfaces 61 and high surfaces 62 interconnected by inclined ramp surfaces 63. These surfaces lie opposite fluid nozzles, 64, 65, and 66, through which fluid flows and which communicate with the lines 43, 44, 45, respectively, in which the binary devices 40, 41, 42, respectively, are located. The surfaces 61, 62, 63 extend transversely of the direction of movement of the control plate member 60 and upon movement of the output member 12, move relative to the nozzles 64, 65, and 66.

Depending upon the particular relative location of the nozzles 64, 65, 66 and the surfaces 61, 62, 63, one of the binary devices is rendered effective to apply or transmit an input signal to the chamber 30 of the valve 20 to cause movement of the spool 21 in one direction and another of the binary devices is rendered effective, when opened, to transmit an input signal to the valve 20 to move the spool thereof in the other direction. The third binary device, if opened, effects no movement of the spool 21. In the position shown in FIG. 2, a high surface 62a is located immediately opposite the nozzle 66, while a ramp surface 63a is located immediately opposite the nozzle 65, and a low surface 61a is located immediately opposite the nozzle 64. In this position, a high back pressure is provided in the conduit 45, while a medium back pressure or intermediate back pressure is provided in the conduit 44, and a low back pressure is provided in the conduit 43. Thus, upon opening of the binary device 40, a very low pressure input signal is transmitted thereby to the chamber 30. If the binary device 41 is opened, a medium pressure input signal is transmitted to the chamber 30, while if the binary device 42 is opened, a high pressure input signal is transmitted thereby to the chamber 30.

If a low pressure input signal is applied to the chamber 30 of the valve 20, the spool 21 will be moved to the left causing movement of the piston 18 to the left, as discussed hereinabove. Movement of the piston rod 12 to the left causes the inclined surface designated 63a, as shown in FIG. 3, to move beneath and immediately opposite the nozzle 64, thereby causing an intermediate pressure to be applied to the chamber 30. When an intermediate pressure is applied to chamber 30, the spool returns to its neutral position and the motor is then de-energized. Thus, the motor has been stepped one increment to the left.

If further stepping movement of the motor was desired, since the parts are in the position shown in FIG. 3, the binary device 40 would be closed, and the binary device 42 opened. Closing of the binary device 40 and opening of the binary device 42, places conduit 45 in communication with chamber 30. Conduit 45 has a low pressure therein since it is opposite low surface 61b and the spool 21 again moves to the left and the output member 12 moves to the left. The movement is continued until the input signal is interrupted by ramp portion 63b moving under the opposite nozzle 66. In this position, as shown in FIG. 4, nozzle 65 is located opposite low surface 61b and the closing of binary device 42 and opening of the binary device 41 continues the stepping of the motor to the left in the manner described above. Therefore, it can be seen that if the binary devices 40, 41, and 42 are energized in a sequential manner, the piston 18 may be moved in a stepwise manner toward the left, the sequence starting from the position shown in FIG. 2 being 40, 42, 41 and then repeating until the limit of movement is reached.

If it is desired to move the piston 18 or the output member of the motor 11 to the right in a stepwise manner, the pressure in the chamber 30 of the valve must be greater than that of the spring 29. Thus, a high pressure input signal must be applied thereto. This is achieved by opening the binary device associated with the nozzle which is opposite a high surface on the control plate member. Starting with the parts in the position shown in FIG. 2, the binary device 42 is opened and, as a result, a high pressure is established in the chamber 30 of the valve 20 because of the fact that the surface 62a of the control plate 60 is closely spaced and directly opposite to the nozzle 66. This high pressure in the chamber 30 causes the valve spool 21 to move to the right, as viewed in FIG. 1. Movement of the valve spool to the right causes the piston 18 to move to the right, as described hereinabove. The movement of the output member 12 to the right continues until the ramp surface 63a moves under nozzle 66 to interrupt the control signal. At this time, however, nozzle 64 is immediately opposite high surfaces 62b and therefore binary device 40 is opened as binary device 42 is closed to again index or step the motor to the right, which movement continues until the ramp 63c moves opposite nozzle 64. At this time, surface 62b is opposite nozzle 65, and opening of binary device 41, along with closing of binary device 40, effects further indexing to the right. Thus, it should be apparent that sequential opening of the binary devices in the sequence of 42, 40, 41 effects indexing of the motor to the right. Such sequential actuation may be effected by the control 55 for the binary devices.

It should be apparent from the above that the surfaces on the control plate 60 render the binary devices effective to apply or transmit an input signal to the valve 20 to energize the motor 11 and that the surfaces are effective to interrupt the signal transmitted by the binary devices due to the fact that the ramps 63 stop energization of the motor whenever a ramp comes immediately beneath or adjacent to the nozzle which is associated with the binary device which is open. This is clear from the description hereinabove. Moreover, it should be apparent that if the plate 60 had only one ramp 63, one low surface 61, and one high surface 62, the control would function to provide three positions and would be a three-position absolute positioner, in that each binary device would be associated with a particular and unique motor position.

The present invention is shown in FIG. 5 as an application to another control mechanism. The control mechanism illustrated in FIG. 5 basically operates on the same principle as that described hereinabove in connection with the embodiment of FIG. 1. The embodiment of FIG. 5 includes an electric rotary motor 100 and which includes a movable output member 101 which is in turn connected with a load to be accurately positioned. The motor is energizable to rotate its output member in opposite directions by a different voltage amplifier 103. The amplifier 103 is energized by a plurality of spaced fixed light responsive members in the form of photovoltaic strips 106, 107 which are located on one side of the control member 102 adjacent the periphery thereof. The strips 106, 107 extend radially and are spaced circumferentially a predetermined distance apart.

A plurality of binary devices in the form of lights 108, 109, 110 are located on the side of the control disk 102 opposite the side on which the strips 106 and 107 are located. The binary devices 108, 109, 110 are selectively and sequentially acutated or lighted by a suitable control mechanism, designated 112, for a purpose to be described hereinbelow. The control mechanism 112 may be in the form of the control mechanism 55 in the embodiment of FIG. 1.

The disk 102 has a plurality of passages or openings therethrough formed in a particular pattern on the periphery thereof and specifically in the portion of the disk 102 which rotates between the lights 108, 109, 110 and the strips 106, 107. The holes may be said to be in a pattern of sets of three positioned or stagggered along the periphery of the disk 102 and spaced radially inwardly thereof. Considering one set of holes, such as the set 115, designated in FIG. 5, the outer hole 116 thereof is positioned to move into alignment with the light 108, while the middle hole 117 and inner hole 118 align with the lights 109 and 110, respectively.

The motor 100 is energized when the light which falls on the strips 106, 107 provides a voltage difference on the lines leading to the different voltage amplifier 103. When no light is shining on the strips 106, 107, or when the two are equally illuminated, there is no voltage difference. However, if light shines on either of the strips 106, 107 and not on the other, there is a voltage difference which causes the motor 100 to be energized. Specifically, if light shines on the strip 106 and not on 107, the motor is energized to rotate in a clockwise direction, as viewed in FIG. 5, while if the light shines on the strip 107 and not on 106, the motor 100 is energized to rotate in a counterclockwise direction.

It can be seen that in the position illustrated in FIG. 5, the lights 108 and 110, if energized, will cause the motor to be energized in a particular direction, whereas, if the light 109 is energized, the motor will not move due to the fact that the light 109 shines through the hole 117 and does not illuminate either of the strips 106 or 107. It is of course possible to step the motor in either direction from the position shown in FIG. 5 by simply changing the status of the lights 108, 109, and 110. For example, to step the motor in a clockwise direction, the light 108 would be turned on and the lights 109, 110 would be turned off. This would provide a voltage difference due to the illumination of the strip 106 causing the motor 100 to rotate in a clockwise direction.

Rotation of the motor in a clockwise direction causes the disk 102 to rotate likewise in a clockwise direction from the position shown in FIG. 5. The rotation continues with decreasing applied voltage until the hole 116 moves to the position shown in FIG. 6 wherein it is located intermediate or in a neutral zone between the strips 106 and 107, in which position no light is transmited to the strip 106 or 107. In the event that the opening 116 moves so as to illuminate the strip 107, a counterclockwise voltage will be applied tending to move the motor output member 101 in a counterclockwise direction. Thus, it can be seen that the opening 116 will be moved to a position substantially centered between the strips 106, 107 to the position shown in FIG. 6.

In this position, it should be apparent that the opening 118a is now in alignment with the strip 106 and continued rotation in the clockwise direction may be effected by actuation of the light 110, while lights 108 and 109 are off. Illumination of the light 110, of course, causes illumination of the strip 106 due to the fact that the opening 118a is in alignment therewith and effects further stepwise rotation in the clockwise direction of the disk 102 in the manner described hereinabove. Of course, the opening 117a then comes into alignment with the strip 106 and if the light 109 were then energized and the lights 108 and 110 turned off, further stepwise rotation would occur. In this manner, it can be readily seen that due to the sequential energization of the lights or binary devices 108, 109, 110, incremental indexing or stepping of the motor 100 in a clockwise direction may occur.

Rotation of the disk 102 and the output member 101 of the motor in a counterclockwise direction, as viewed in FIG. 5, may be accomplished by sequentially actuating the binary devices or lights 108, 109 in a sequence different from that described above to effect the clockwise rotation thereof. Starting from the position shown in FIG. 5, if the light 110 were energized, light is directed through the opening 118 and illuminates the strip 107. This causes a voltage to be applied to the motor and counterclockwise rotation of the motor. The counterclockwise rotation occurs until the opening 118 moves out of alignment with the strip 107 and into the position shown in FIG. 7 wherein it is in alignment with the neutral position between the strips 106 and 107. When so moved, the openings will be in the position illustrated in FIG. 7 and opening 116b will be in alignment with the strip 107. Thus, the light 110 may be turned off and the light 108 turned on, which causes light to again illuminate the strip 107 due to the alignment of the openings 116b with the strip 107, and the disk again indexes in the counterclockwise direction. Rotation continues until the opening 116b moves into the neutral position, at which time the opening 117b is in alignment with the strip 107 and illuminates the strip 107 to effect a further indexing if the light 109 is activated. Thus, it can be seen that the motor may be indexed either in a clockwise or counterclockwise direction, depending upon the sequence of the illumination of the lights 108, 109, 110.

It should be apparent from the above description that applicant has provided a new and improved control mechanism which may be applied to either rotary or reciprocating type motors and either fluid or electric motors. It should also be apparent that numerous modifications, changes, and adaptations may be made therein by those skilled in the art, and it is hereby intended to cover all such modifications, changes, and adaptations which come within the scope of the appended claims.

Having described my invention, I claim:

1. A control mechanism comprising a motor having an output member for moving a load to a given position, a first binary control device located in a first input path leading to the motor and operable to transmit an input signal to energize said motor, a second binary control device located in a second input path leading to the motor and operable to transmit an input signal to energize said motor, a control member movable with said output member and having means associated with each of said binary devices for rendering said first binary device effective to transmit an input signal to energize said motor in a first direction and for rendering said second binary control device effective to transmit an input signal to energize said motor in a second direction opposite said first direction, said control member further having means for interrupting said input signal transmitted by said first and second binary control devices after a predetermined amount of movement of the output member in said first or second direction, and means for actuating said first or second binary control devices to step said output member.

2. A control mechanism comprising a motor having an output member for moving a load to a given position, a first binary control device located in a first input path leading to the motor and operable to transmit an input signal to energize said motor, a second binary control device located in a second input path leading to the motor and operable to transmit an input signal to energize said motor, a third binary control device located in a third input path and operable to transmit an input signal to energize said motor, a control member movable with said output member and having means associated with each of said binary control devices for rendering said first binary control device effective to transmit an input signal to energize said motor in a first direction and rendering said second binary control device effective to transmit an input signal to energize said motor in a second direction and rendering said third binary control device ineffective to transmit a control signal, and said control member having means for interrupting said input signal transmitted by said first and second binary control devices after a predetermined amount of movement of the output member and means for rendering said third binary control device operable to transmit an input signal to said motor and means for rendering either of said first or second binary devices effective to transmit an input signal and the other ineffective to transmit an input signal, and means for sequentially actuating said binary control devices to incrementally step said output member of said motor.

3. A control mechanism comprising a motor having an output member for moving a load to a given position, a first binary control device located in a first input path leading to the motor and operable to transmit an input signal to energize said motor, a second binary control device located in a second input path leading to the motor and operable to transmit an input signal to energize said motor, a third binary control device located in a third input path and operable to transmit an input signal to energize said motor, a control member movable with said output member and having means associated with each of said binary control devices for rendering said first binary control device effective to transmit a first input signal and rendering said second binary control device effective to transmit a second input signal and rendering said third binary control device ineffective, a control device associated with said motor and responsive to said first input signal to energize said motor in a first direction and responsive to said second input signal to energize said motor in a second direction, said control member having means for interrupting said first and second input signals transmitted by said first and second binary control devices after a predetermined amount of movement of the output member and means for rendering said third binary control device operable to transmit an input signal to said control device and either of said first or second binary devices effective to transmit an input signal to said control device and the other ineffective to transmit an input signal, and means for sequentially operating said binary control devices to incrementally step said output member of said motor.

4. A control mechanism as defined in claim 3 wherein said control member has a portion thereof associated with each binary device and which sequentially renders the binary device operable to transmit a first input signal, no input signal, and a second input signal.

5. A control mechanism as defined in claim 4 wherein said portions of said control member are staggered so that at all times only one binary device is effective to transmit a first or second input signal.

6. A control mechanism comprising a rectilinear motor having a reciprocating output member for moving a load to a given position, a first binary control device located in a first input path leading to the motor and operable to transmit an input signal to energize said motor to move the output member linearly in a first direction, a control member movable linearly with said output member and having means for interrupting the input signal transmitted by said first binary control device after a first predetermined amount of linear movement of the input member, a second binary control device located in a second input path leading to the motor and operable to transmit an input signal to energize said motor to move the output member linearly in said first direction, said control member having means for rendering said second binary control device effective to transmit an input signal to energize said motor in a second direction opposite said first direction and means for rendering said second binary control device effective after said predetermined amount of linear movement to transmit an input signal to energize said motor to move said output member linearly in said first direction, said control member further including means for interrupting said input signal transmitted by said second binary control device after a second predetermined amount of linear movement of the output member, and means for sequentially actuating said first and second binary control devices to incrementally and linearly step said output member of said motor.

7. A control mechanism comprising a fluid motor having an output member for moving a load to a given position, a first binary valve device located in a first fluid input line and operable to transmit a fluid input signal to energize said motor, a second binary valve device located in a second fluid input line and operable to transmit a fluid input signal to energize said motor, a control member movable with said output member and having means associated with each of said binary valve devices for rendering said first binary valve device effective to transmit a fluid input signal to energize said motor in a first direction and for rendering said second binary valve device effective to transmit an input signal to energize said motor in a second direction opposite said first direction, said control member further having means for interrupting said fluid input signal transmitted by said first and second binary valve devices after a predetermined amount of movement of the output member in said first or second direction, and means for actuating said first or second binary valve device to step said output member.

8. A control mechanism as defined in claim 7 further including fluid nozzle means associated with each of said binary valve devices, and said output member has high and low surfaces opposite said fluid nozzle means providing high and low back pressures in the fluid input lines which pressures constitute said input signals to energize said motor in said first and second directions.

9. A control mechanism as defined in claim 7 further including a third binary valve device located in a third fluid input line and operable to transmit a fluid input signal to energize said motor, and said control member includes means associated with said third binary valve device rendering said third binary valve device ineffective, and means for rendering said third binary valve device operable to transmit a fluid input signal to said motor and either of said first or second binary devices effective to transmit a fluid input signal and the other ineffective to transmit a fluid input signal to energize said motor, and said means for actuating said binary valve devices to incrementally step said output member of said motor is operable to sequentially actuate said binary valve devices.

10. A control mechanism as defined in claim 9 further including fluid nozzle means associated with each of said binary valve devices, and said output member has a plurality of repeating high, low and inclined ramp surface portions opposite said nozzle means, respectively, and providing high, low and intermediate back pressures in the fluid lines containing said binary valve devices and said high and low pressures constituting input signals effective to energize said motor in opposite directions and said intermediate back pressure being ineffective to energize said motor.

11. A control mechanism as defined in claim 10 wherein said input signals are applied to a valve mechanism and said high and low input signals actuate the valve mechanism to connect said motor to a source of fluid pressure for energizing the motor.

12. A control mechanism as defined in claim 7 wherein said fluid motor is of the reciprocating type having a piston movable in a cylinder.

13. A control mechanism comprising an electric motor having an output member for moving a load to a given position, a first light located in a first input path leading to the motor and operable to transmit an input light signal to energize said motor, a second light located in a second input path leading to the motor and operable to transmit an input light signal to energize said motor, a control member movable with said output member and having means associated with each of said lights for rendering said first light effective to transmit an input light signal to energize said motor in a first direction and for rendering said second light effective to transmit an input light signal to energize said motor in a second direction opposite said first direction, said control member further having means for interrupting said input light signal transmitted by said first and second lights after a predetermined amount of movement of the output member in said first or second direction, and means for actuating said first or second lights to step said output member.

14. A control mechanism as defined in claim 13 further including a third light located in a third input path to transmit an input light signal to energize said motor, and said control member includes means for interrupting the input light signal of said third light when said first and second lights are effective to energize said motor and means after a predetermined movement of the output member for rendering said third light operable to transmit a light input signal and either of said first and second lights effective to transmit a light signal and the other ineffective to transmit a light signal, and said means for actuating said lights sequentially actuates said lights.

15. A control mechanism as defined in claim 14 wherein said control member includes a plurality of passageways therethrough, and having light responsive strips spaced on the side of said control member opposite the side on which the lights are located, one of said strips when illuminated actuating said motor in one direction and the other of said strips actuating the motor in the reverse direction, and said passageways being arranged in sets of three staggered openings so that at all times when no movement is occurring two of the lights are aligned with a strip and one light is aligned with the space between the strips.

16. A control mechanism as defined in claim 15 wherein said motor is a rotary electric motor and said control member comprises a disk member and said set of three passageways are spaced radially thereof and staggered circumferentially thereof and said strips are spaced circumferentially and extend radially thereof.

17. A control mechanism comprising a motor having an output member for moving a load to a given position, a first binary control device located in a first input path leading to the motor and operable to transmit an input signal to energize said motor, a second binary control device located in a second input path leading to the motor and operable to transmit an input signal to energize said motor, a third binary control device located in a third input path and operable to transmit an input signal to energize said motor, a control member movable with said output member and having means associated with each of said binary control devices for rendering said first binary control device effective to transmit an input signal to energize said motor in a first direction and rendering said second binary control device effective to transmit an input signal to energize said motor in a second direction and rendering said third binary control device ineffective to transmit a control signal, and said control member having means for interrupting said input signal transmitted by said first and second binary control devices after a predetermined amount of movement of the output member and means for rendering said third binary control device operable to transmit an input signal to said motor.

18. A control mechanism for a motor having an output member for moving a load, said control mechanism comprising control means for selectively energizing said motor to operate in first or second opposite directions, a first binary device for actuating said control means, a second binary device for actuating said control means, a member movable with said motor output, said member when in one position having means for transmitting a signal from said first binary device to energize said control means to effect operation of said motor in said first direction and means for transmitting a signal from said second binary device to energize said control means to effect operation of said motor in said second direction, said member having means for interrupting signals from said first and second binary devices as said member moves in said first or second direction respectively, and said member further including means for rendering said second binary device effective to energize said control means to effect operation of said motor in said first direction after a predetermined amount of movement of said member in said first direction.

19. A control mechanism for a motor having an output for moving a load, said control mechanism comprising first and second binary devices for providing control signals, a control unit operatively connected with both of said first and second binary devices and operative to apply a motor energizing signal to said motor in response to receipt of a control signal from said first or second binary device, means interconnecting said control unit and said motor and providing a single path therebetween for said motor energizing signal, a member movable with said motor output, said member when in one position having means for transmitting a signal from said first binary device to energize said control unit to effect operation of said motor in one direction, said member also having means for interrupting the signal from said first binary device to said control unit after said member moves a predetermined distance in said one direction, and said member further including means for rendering said second binary device effective to energize said control unit to effect operation of said motor in said first direction after said predetermined amount of movement of said member in said first direction, and means for sequentially actuating said first and second binary devices to incrementally step the output member of said motor.

References Cited

UNITED STATES PATENTS

| | | | |
|---|---|---|---|
| 2,402,928 | 6/1946 | Summers | 318—27 |
| 3,096,467 | 7/1963 | Angus et al. | 318—480 XR |
| 3,117,266 | 1/1964 | Raymond | 318—480 XR |
| 3,215,045 | 11/1965 | Lissau | 91—388 |
| 3,215,044 | 11/1965 | Lissau | 91—388 |
| 3,164,065 | 1/1965 | Frantz | 91—388 XR |

BENJAMIN DOBECK, *Primary Examiner.*

U.S. Cl. X.R.

91—385, 388; 318—138